March 10, 1959      K. C. ROCK      2,877,385
ELECTRIC SYSTEM

Filed Aug. 21, 1957

INVENTOR.
KINGSLEY C. ROCK
BY
ATTORNEY

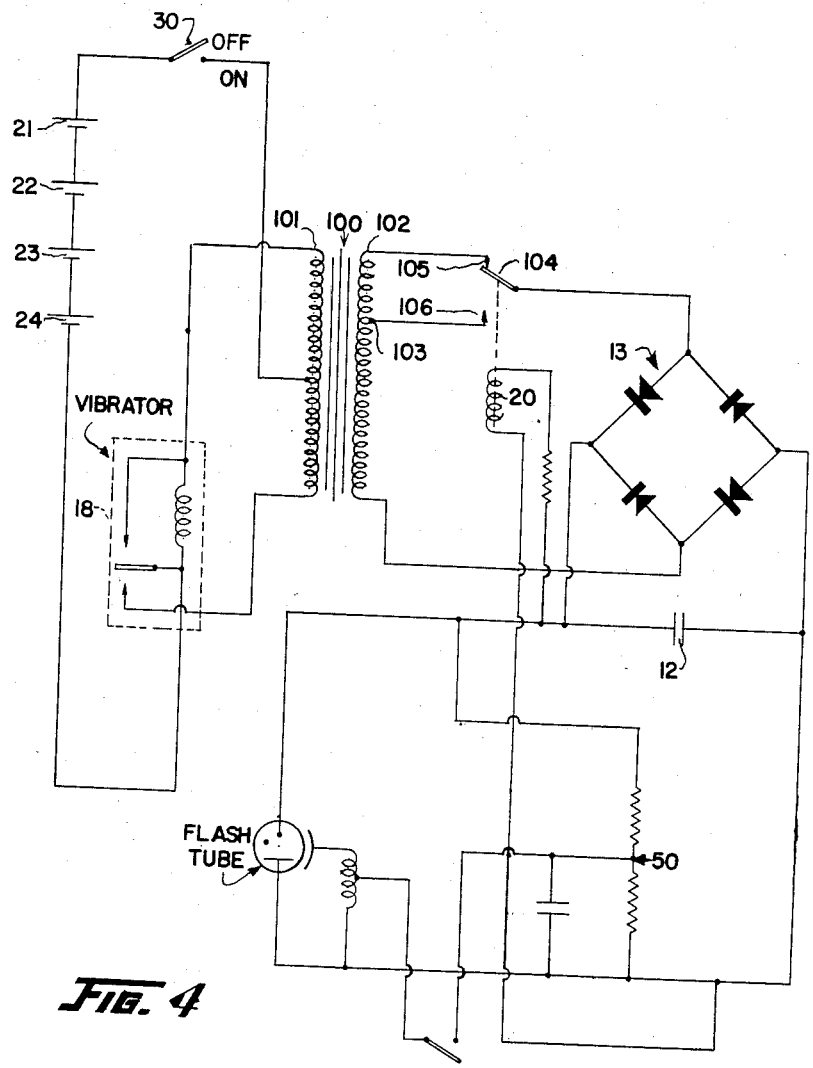

United States Patent Office 2,877,385
Patented Mar. 10, 1959

2,877,385

ELECTRIC SYSTEM

Kingsley C. Rock, Englewood, Colo., assignor to Minneapolis-Honeywell Regulator Company, a corporation of Delaware Application August 21, 1957, Serial No. 679,356

13 Claims. (Cl. 315—202)

The present invention is concerned with an improved electric system and more particularly with an improved arrangement in which a capacitor is charged from a direct current source of voltage. The preferred modification of the present invention deals with a photographic flash circuit wherein a capacitor is discharged through the flash tube to produce a brilliant flash of light. The charging voltage for the capacitor is derived from a plurality of relatively low voltage direct current voltage sources.

One of the important factors to consider in photographic flash equipment is the recycle time of the flash unit. This is of particular importance in the electronic type flash units wherein a gas filled flash tube is used and a capacitor is discharged through the tube. In this type of apparatus, the flash tube is capable of very rapid cycling and the limiting feature in its cycling rate is the speed with which the capacitor can be recharged.

It is an object of the present invention to provide an improved apparatus which shortens the charging time of a capacitor and reduces the leakage current while the charge is being maintained.

It is a further object of the present invention to provide an improved photographic flash apparatus utilizing a capacitor and providing means responsive to the state of charge of the capacitor to charge the capacitor first from a relative high voltage direct current source and to then maintain the charge on the capacitor for a direct current source of lower magnitude.

It is a further object of the present invention to provide an improved voltage source for use with a gas filled flash tube utilizing a capacitor which is discharged through the flash tube and having means to charge the capacitance from a high voltage source, such as a plurality of direct current voltage sources which are connected in series, to thereby produce a high charging voltage for the capacitor, and then to produce a lower voltage which maintains the charge on the capacitor, such as connecting the plurality of direct current voltage source in parallel.

These and other objects of the present invention will be apparent to those skilled in the art upon reference to the following specification, claims, and drawing of which:

Figure 4 is a further modification wherein the relay switching modifies the transformer secondary connection.

Figure 1:
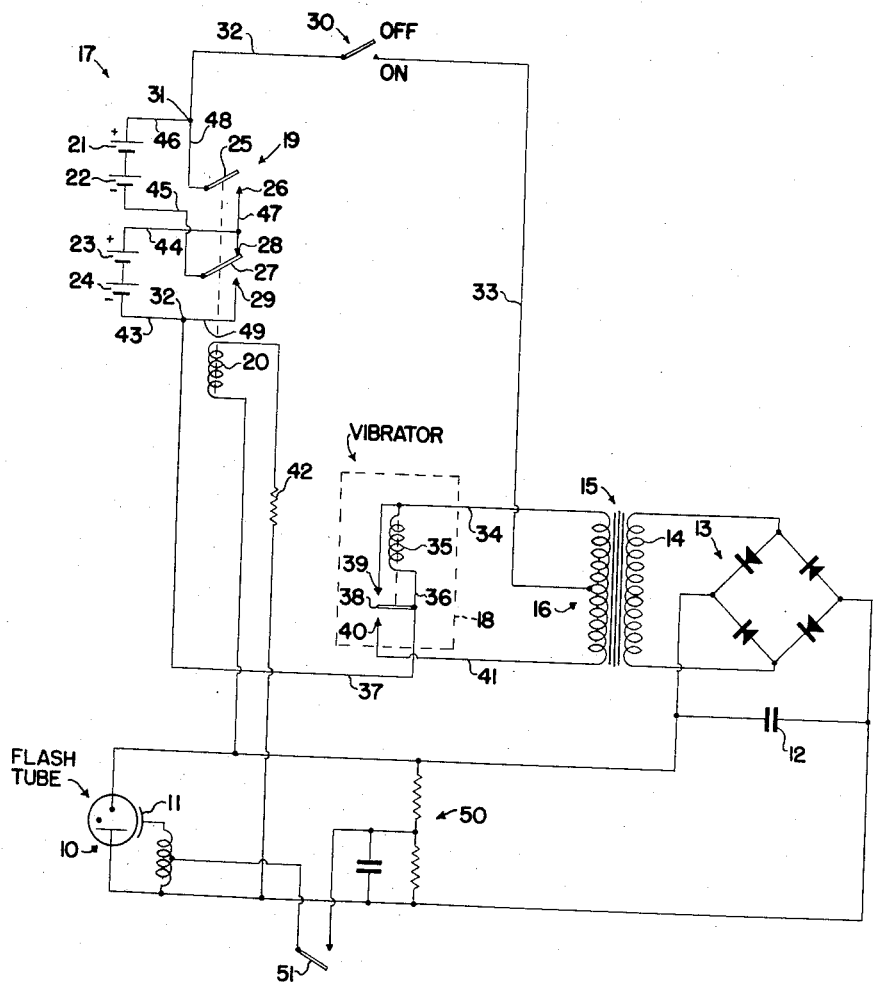
Figure 1 is the schematic representation of a modification of the present invention.

Referring to Figure 1, the reference numeral 10 designates a gas filled type photographic flash tube having a starting electrode 11. Electrical energy for flash tube 10 is derived from a capacitor 12. Capacitor 12 is connected to the output of a bridge rectifier 13 to be charged thereby.

The alternating voltage for bridge rectifier 13 is derived from the secondary winding 14 of a stepup transformer 15 having a primary winding 16. The primary winding 16 of transformer 15 is connected to a plurality of direct voltage sources, designated generally by the reference numeral 17, and having a positive terminal 31 and a negative terminal 32. This connection of secondary winding 16 to voltage sources 17 is accomplished through a vibrator, designated by the reference numeral 18, and through switching means 19 controlled by a relay 20.

The direct current voltage sources 17 are, in the specific modification shown, four D-type batteries which supply approximately one and one-half volts each. These batteries are located in two banks, with batteries 21 and 22 being connected in series and batteries 23 and 24 being connected in series.

Figure 2:
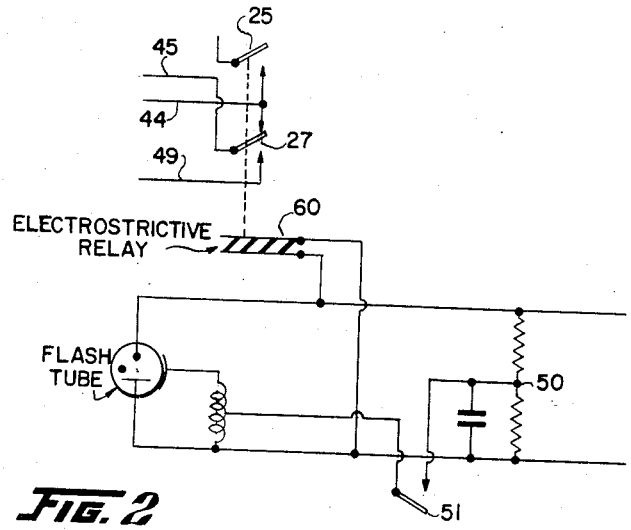
Figure 2 is a further modification wherein an electrostrictive relay is substituted for the electromagnetic relay of Figure 1.

Relay 20 is shown in its de-energized condition. In this condition a movable switch blade 25 disengages contact 26 and a movable switch blade 27 engages contact 28 and disengages contact 29. Upon energization of the relay 20, the movable switch blade 25 engages contact 26 and movable switch blade 27 disengages contact 28 and moves into engagement with contact 29. The relay 20 of Figure 1 is a low current drain electromagnetic relay. As shown in Figure 2, this relay may be replaced by an electrostrictive type relay 60.

The operation of Figure 1 of the present invention will now be described. The apparatus as shown in Figure 1 is in the off condition. Upon closing of the master operating switch 30, an alternating voltage is induced in the secondary winding 14 of step-up transformer 15. The output of direct current voltage source 17 exists between the positive terminal 31 and the negative terminal 32. Upon closing of the switch 30, a circuit can be traced from terminal 31 through conductor 32, switch 30, conductor 33, the upper portion of secondary winding 16, conductor 34, winding 35 of vibrator 18, and conductors 36 and 37 to the negative terminal 32. This above traced circuit energizes the winding 35 of vibrator 18.

Energization of this winding causes movable switch blade 38 to move into engagement with contact 39. As can be seen, a circuit is now completed which shunts the winding 35 of vibrator 18. Furthermore, a circuit is now completed through the upper portion of the secondary winding such that this upper portion is directly connected across the power supply terminals 31—32, thereby producing a first pulse of voltage in the secondary winding 14.

Upon winding 35 being de-energized, as above described, movable switch blade 38 disengages contact 39, due to bias means for switch blade 38, not shown, and moves into engagement with contact 40. This completes an energizing circuit for the lower half of the secondary winding 16, it being remembered that the energizing circuit for the upper half of this secondary winding is broken upon switch blade 38 disengaging the contact 39.

The energizing circuit for the lower portion of secondary winding 16 can be traced from power supply terminal 31 through conductor 32, switch 30, conductor 33, the lower portion of secondary winding 16, conductor 41, contact 40 and switch blade 38, and conductor 37 to power supply terminal 32. This produces a second pulse of voltage in the secondary winding 14. In this manner, vibrator 18 functions to produce an alternating voltage in the secondary winding 14. This alternating voltage is rectified by the bridge rectifier 13 and produces a charge on capacitor 12.

The apparatus thus far described provides the manner of charging of capacitor 12, however, the present invention provides an improved arrangement for a fast charge of this capacitor and a reduced leakage current to maintain the charge thereon. Consider now the manner in which relay 20 and its switch means 19 controls the magnitude of voltage between the terminals 31—32. The winding of relay 20 is connected across capacitor 12 through a resistor 42. Therefore, relay 20 is responsive to the state of charge of capacitor 12. Upon capacitor 12 reaching a predetermined state of charge, the relay winding of relay 20 is energized to cause the associated switch blades to move from the de-energized position shown in Figure 1 to the energized position.

With relay 20 de-energized, batteries 21 and 22 are connected in series with batteries 23 and 24. This can be seen by tracing a circuit from terminal 32 through conductor 43, batteries 24 and 23, conductor 44, contact 28 and switch blade 27, conductor 45, batteries 22 and 21, and conductor 46 to terminal 31. From this circuit it can be seen that with relay 20 in a de-energized condition the voltage between the terminals 31 and 32 is the sum of the voltages of the batteries 21 through 24, these batteries being connected in series.

Consider now the voltage between the terminals 31 and 32 with the relay 20 energized, as it will be when the capacitor 12 reaches a predetermined condition of charge. A circuit can now be traced which places series connected batteries 21 and 22 in parallel with series connected batteries 23 and 24. A first circuit can be traced from terminal 32 through conductor 43, batteries 24 and 23, conductors 44 and 47, contact 26 and switch blade 25, and conductor 48 to terminal 31. A second circuit can be traced from terminal 32 through conductor 49, contact 29 and switch blade 27, conductor 45, batteries 22 and 21, and conductor 46 to terminal 31. From these last two traced circuits it can be seen that the voltage between the terminals 32 and 33 is now one-half of that voltage which existed when the relay 20 was de-energized. In other words, batteries 21 and 22 are now connected in parallel with batteries 23 and 24.

It therefore follows that the voltage which is derived from the output of the bridge rectifier 13 is greater when the relay 20 is de-energized than when this relay is energized. In this manner, the initial charging voltage for capacitor 12 is relatively high to reduce the charging time of the capacitor. Upon the capacitor 12 nearing its charged condition, relay 20 is energized and the charging voltage, that is the output voltage of bridge rectifier 13, is reduced to maintain the charge on this capacitor. This reduced voltage maintains a sufficient voltage on capacitor 12 to fire flash tube 10. Moreover the leakage current which must be supplied to the capacitor 12 is reduced, as compared to the leakage current if the batteries were permanently connected in series. In this manner, the life of the batteries is increased.

As above mentioned, relay 20 is of the type having a low current drain, thereby minimizing the load on the batteries. Referring to Figure 2, the member 60 designates an electrostrictive type relay which is in essence a capacitor electrically and has the property of deforming when placed in an electric field, the active material being one member of a bimorph pair. Relay 60 functions in an identical manner to relay 20 to thereby control switch blades 25 and 27.

Once capacitor 12 has reached its charged condition, the electrical energy stored in this capacitor is available to the flash tube 10 to produce a brilliant flash of light. The flash tube 10 is controlled by a triggering circuit designated generally by the reference numeral 50 and having an actuating switch 51. Switch 51 may be a manually operated switch or an automatic switch operated by camera shutter contacts or the like. Upon closing of the switch 51 the starting electrode 11 is activated and capacitor 12 discharges through the flash tube 10 to produce a brilliant flash of light.

Relay 20, which is energized with capacitor 12 in its charged condition, now becomes de-energized and once again the batteries of voltage source 17 are connected in a series circuit, to recharge capacitor 12 in a short time. As above described, once capacitor 12 nears its charged condition the batteries of voltage source 17 are connected in parallel and the charge is maintained on capacitor 12, with the apparatus in the standby condition awaiting further actuation of the switch 51.

Figure 3:
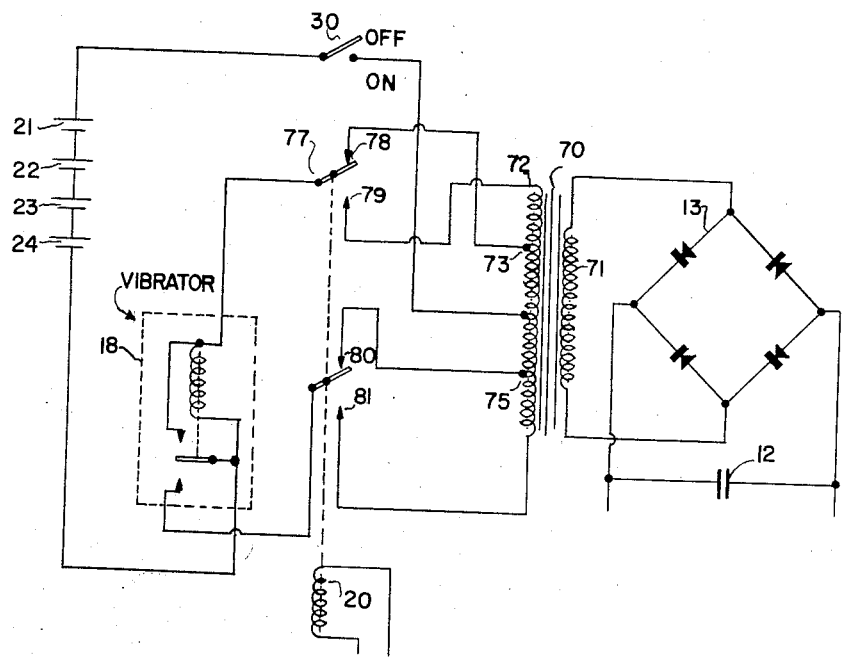
Figure 3 is a further modification wherein the relay switching modifies the transformer primary connection rather than the battery connection as in Figure 1.

Referring to Figure 3, a further modification of the present invention is shown wherein the relay 20 utilized in Figure 1, as above described, includes movable switch blades 76 and 77 cooperating with stationary contacts 78, 79, 80 and 81. Relay 20 is shown in its de-energized condition wherein the switch blades 76 and 77 engage contacts 80 and 78, respectively. Upon energization of the winding of relay 20, movable switch blades 76 and 77 disengage contacts 80 and 78 respectively and move into engagement with contacts 81 and 79. As in Figure 1, the apparatus of Figure 3 utilizes batteries 21, 22, 23, and 24 for the primary source of voltage. In the case of Figure 3 however these four batteries are permanently conected in series and by means of the switch 30, the vibrator 18, and a transformer 70, alternating voltage is applied to the bridge rectifier 13 to charge capacitor 12 as above described.

In the modification shown in Figure 1, the voltage applied to capacitor 12 is initially of the relatively high value and upon capacitor 12 receiving a substantial charge, the relay 20 is actuated to reduce the voltage applied to capacitor 12. In Figure 1 this is achieved by connecting the batteries in parallel rather than in series. In the modification of Figure 3, the relay 20 functions to increase the number of turns in the primary winding 72 of transformer 70 and thereby reduce the voltage applied to the capacitor 12. It can be seen in Fig. 3 that with relay 20 deenergized, the movable switch blades 76 and 77 make connection to the taps 73 and 75 of the primary winding 72. Therefore, the voltage induced in the secondary winding 71 of transformer 70 is of a first value. Upon the relay 20 being energized, the switch blades 76 and 77 make connection to the two end terminals of the secondary winding 72, thereby increasing the effective turns in the primary winding. This in effect reduces the primary-to-secondary turns ratio of the transformer 70 and therefore reduces the voltage induced in the secondary winding of this transformer. This of course, reduces the voltage applied to the capacitor 12. For purposes of simplicity, the specific connections of capacitor 12 and relay 20 to the circuit including the flash tube have been eliminated. These connections are however identical to those shown in Figure 1.

Referring now specifically to Figure 4, still a further modification of the present invention is shown wherein the relay 20 is provided with a single movable switch blade 104 which cooperates with switch contacts 105 and 106. Relay 20 is shown in its deenergized condition wherein switch blade 104 engages contact 105. Upon energization of this relay, switch blade 104 disengages contact 105 and moves into engagement with contact 106. In this modification, a transformer 100 is provided having a primary winding 101 and a secondary winding 102 provided with a tap 103 connected to the contact 106 of relay 20. As with Figure 3, the four batteries 21, 22, 23 and 24 are permanently connected in a series circuit and by means of switch 30 and vibrator 18 a voltage is applied to the primary 101 of transformer 100, thereby causing an alternating voltage to be induced in the secondary winding 102 of this transformer.

In the modification of Figure 4, relay 20 performs its switching function in the secondary winding 102 of the transformer 100 rather than in the primary winding of the transformer such as in Figure 3. With relay 20 in its de-energized condition, as shown in Figure 4, the entire secondary 102 of the transformer 100 is utilized and a maximum voltage is applied to the bridge rectifier 13 to thereby charge capacitor 12. However, upon capacitor 12 receiving a given charge, sufficient to energize relay 20, the movable switch blade 104 disengages contact 105 and moves into engagement with contact 106. This reduces the voltage applied to the bridge rectifier 13 and thereby reduces the voltage applied to capacitor 12.

It can be seen from the above description that I have provided an improved electrical system and particularly an improved apparatus for charging a capacitor to be utilized in a photographic flash system to thereby provide fast recycle and minimum current drain from the batteries. These and other modifications of the present invention will be apparent to those skilled in the art and it is intended that the present invention be limited solely by the scope of the appended claims.

I claim as my invention:

1. Control apparatus for charging a capacitor comprising; a capacitor to be charged, a plurality of direct current voltage sources, circuit means normally connecting said plurality of direct current voltage sources in series to thereby apply a high charging voltage to said capacitor to charge said capacitor to a predetermined value in a relatively short time, and means responsive to the state of charge of said capacitor and arranged to modify said circuit means to place said plurality of direct current voltage sources in parallel, thereby reducing the voltage applied to said capacitor after said predetermined charge has been received by said capacitor.

2. Apparatus for charging the capacitor of a photographic flash circuit comprising; a capacitor adapted to be discharged through a photoflash lamp to produce a brilliant flash of light, a plurality of direct current voltage sources, circuit means connecting said direct current voltage sources to said capacitor and normally arranged to connect said voltage sources in a series circuit to thereby apply a relatively high voltage to said capacitor such that said capacitor is charged in relatively short time, and further means responsive to the state of charge of said capacitor and effective when said capacitor reaches a given state of charge to modify said circuit means and place said plurality of direct current voltage sources in parallel, thereby reducing the voltage applied to said capacitor to maintain said capacitor in a charged position and to also reduce the leakage current through said capacitor as said capacitor is maintained in a charged condition.

3. Apparatus for charging a capacitor from a plurality of direct current voltage sources comprising; a capacitor, a relay having a winding and switch means controlled thereby, a plurality of direct current voltage sources, circuit means controlled by said relay switch means when said relay winding is deenergized and connecting said plurality of direct current voltage sources in series to charge said capacitor from a relatively high source of voltage, circuit means connecting said relay winding to said capacitor to thereby energize said relay winding upon a predetermined state of charge existing in said capacitor, said relay when energized altering said circuit means to place said plurality of direct current voltage sources in parallel and thereby reduce the charging voltage for said capacitor.

4. A power source for use with a photographic flash tube comprising; a plurality of batteries, voltage step-up means including a step-up transformer having a secondary winding and a vibrator connected to the primary winding thereof, relay means having a winding and switch means controlled thereby, circuit means controlled by said relay switch means when said relay winding is deenergized connecting said batteries in series to said vibrator and said primary winding, rectifying means, circuit means connecting said rectifying means to the secondary of said transformer, a capacitor arranged to be charged by the output of said rectifier means, circuit means connecting said relay winding across said capacitor such that said relay winding is energized upon a predetermined voltage existing on said capacitor, said relay winding when energized causing said relay switch means to move to an energized position wherein said batteries are connected in parallel to thereby reduce the charging voltage for said capacitor, and further means including a photographic flash tube arranged to discharge said capacitor through said flash tube to produce a brilliant flash of light.

5. A voltage source for use with a gas filled photographic flash tube capable of rapid cycling comprising; a plurality of batteries, voltage step-up means including a step-up transformer and a vibrator connected to the primary winding thereof, relay means having an actuator and switch means controlled thereby, said switch means assuming a first position upon said relay actuator being operative de-energized and assuming a second position upon said relay actuator being operatively energized, circuit means controlled by said relay switch means, said circuit means arranged when said switch means is in said first position to connect said plurality of batteries in series to said vibrator and said transformer primary winding, said circuit means being arranged with said switch means in said second position to connect said batteries in parallel to said vibrator and said transformer primary winding, rectifying means, means connecting said rectifying means to the secondary of said transformer, a capacitor connected to said rectifying means to be charged thereby, circuit means connecting said relay actuator to said capacitor in a manner to be responsive to the state of charge existing on said capacitor, and further circuit means including a gas filled flash tube to cause said capacitor to discharge through said flash tube and produce a brilliant flash of light, said apparatus functioning to produce rapid recharging of said capacitor by placing said batteries in series to produce a high charging voltage for said capacitor, and to then place said batteries in parallel to decrease the charging voltage for said capacitor and thereby reduce the current drain on said batteries as said apparatus is in standby condition.

6. A voltage source for use with a gas filled photographic flash tube capable of rapid cycling as defined in claim 5 wherein said relay means is an electrostrictive relay.

7. Apparatus for charging a capacitor of a photographic flash circuit to facilitate quick recycle comprising; a photoflash lamp, a capacitor adapted to be discharged through said photoflash lamp to produce a brilliant flash of light, circuit means including a source of voltage connected to said capacitor and arranged to apply a relatively high charging voltage to said capacitor such that said capacitor becomes charged in a relatively short time, and a further means responsive to the state of charge of said capacitor and effective when said capacitor reaches a given state of charge to modify said circuit means and thereby apply a reduced voltage to said capacitor to maintain said capacitor in a charged condition with a minimum of leakage current as said capacitor is maintained in the charged condition.

8. Apparatus as defined in claim 7 wherein said further means is an electrostrictive relay.

9. Control apparatus for rapidly charging a capacitor comprising; a capacitor to be charged, electrical network means including a source of voltage connected to said capacitor to apply a relatively high charging voltage to said capacitor, voltage responsive means connected to said capacitor and responsive to the state of charge of said capacitor, and means connecting said voltage responsive means in modifying relation to said network to reduce the voltage applied to said capacitor after a predetermined charge has been received by said capacitor, said voltage responsive means being effective to maintain the charge on said capacitor at said predetermined value despite leakage current through said capacitor.

10. A power supply for a photographic flash unit of the type utilizing a high voltage capacitor comprising; a relatively low voltage direct current source, a vibrator, a transformer having a primary winding with taps thereon and a secondary winding, a high voltage capacitor, rectifying means connected to said transformer secondary winding and to said capacitor to rectify the voltage induced in the secondary of said transformer and charge said capacitor, relay means connected to said capacitor and responsive to the state of charge thereof, said relay means including switch means, circuit means controlled by said relay switch means initially connecting said battery and said vibrator to taps of said primary winding such that a maximum voltage is induced in the secondary winding of said transformer; circuit means connecting said relay to said capacitor to respond to a given state of charge of said capacitor and to alter the manner in which said vibrator, said battery, and said transformer primary winding are inter-connected; thereby altering the primary-to-secondary turns ratio, reducing the voltage induced in said secondary winding, and reducing the voltage applied to said capacitor; and further circuit means connecting said capacitor to a photoflash tube.

11. A power supply for a photographic flash unit comprising; a photoflash tube, a capacitor connected thereto to supply a discharge current to produce a flash of light from said flash tube, a relatively low voltage battery, a vibrator, a transformer having a primary winding and a secondary winding, rectifying means connecting said capacitor to said secondary winding to thereby charge said capacitor from said secondary winding when a voltage is induced in said secondary winding, voltage responsive means connected to said capacitor and including switch means arranged to connect said rectifying means and said capacitor to a first portion of said secondary winding when said voltage responsive means is de-energized and to connect said voltage responsive means to a smaller portion of said secondary winding when said voltage responsive means is energized, and circuit means inter-connecting said battery, said vibrator and said primary winding to cause an alternating voltage to be induced in the secondary winding of said transformer, said voltage responsive means functioning to cause said capacitor to be charged from a relatively high voltage until a given state of charge is achieved thereon and to thereafter maintain the charge on said capacitor from a reduced charging voltage.

12. A power supply for use with a photographic flash circuit comprising; a relatively high voltage capacitor arranged to be connected to a flash tube and to provide a discharge current therefor upon said flash tube being triggered to produce a flash of light, a relatively low voltage battery, a vibrator, a transformer having a primary winding and a secondary winding, rectifying means connecting said capacitor to said transformer secondary winding; circuit means inter-connecting said vibrator, said battery, and said primary winding thereby causing alternating voltage to be induced in said secondary winding; and means responsive to the state of charge of said capacitor arranged to alter the turns ratio of said primary and secondary winding to thereby cause said capacitor to be initially charged from a relatively high voltage and to have a charge maintained thereon from a lower voltage upon said capacitor reaching a predetermined state of charge.

13. Control apparatus for rapidly charging a capacitor of a photographic flash circuit to facilitate quick recycle comprising: a capacitor to be charged, electrical network means including a source of voltage connected to said capacitor to apply a high magnitude charging voltage to said capacitor, the magnitude of said charging voltage being greater than a predetermined voltage to which said capacitor is to be charged, electrical means connected in circuit with said capacitor and responsive to the state of charge of said capacitor, and means connecting said last-named means in modifying relation to said network to reduce the voltage applied to said capacitor after a predetermined charge has been received by said capacitor, said last named means being effective to maintain the voltage on said capacitor at said predetermined value despite leakage current through said capacitor.

References Cited in the file of this patent

UNITED STATES PATENTS

| | | |
|---|---|---|
| 2,262,819 | Rosser | Nov. 18, 1941 |
| 2,347,165 | Aust | Apr. 25, 1944 |
| 2,447,832 | Abend et al. | Aug. 24, 1948 |
| 2,495,301 | Wengel | Jan. 24, 1950 |
| 2,675,515 | Blashfield | Apr. 13, 1954 |
| 2,703,376 | Board | Mar. 1, 1955 |